US008422577B1

(12) United States Patent
Shetty et al.

(10) Patent No.: US 8,422,577 B1
(45) Date of Patent: Apr. 16, 2013

(54) METHOD AND SYSTEM FOR SELECTING CYCLIC PREFIX LENGTH BASED ON SIGNAL QUALITY REPORTS

(75) Inventors: Manoj Shetty, Overland Park, KS (US); Sachin R. Vargantwar, Overland Park, KS (US); Siddharth S. Oroskar, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 90 days.

(21) Appl. No.: 13/072,420

(22) Filed: Mar. 25, 2011

(51) Int. Cl.
*H04K 1/10* (2006.01)
*H04L 27/28* (2006.01)

(52) U.S. Cl.
USPC ............ 375/260; 375/267; 370/203; 370/210

(58) Field of Classification Search .................. 375/260, 375/267, 299; 370/203–211
See application file for complete search history.

(56) References Cited

U.S. PATENT DOCUMENTS

| | | | |
|---|---|---|---|
| 2006/0013325 | A1 | 1/2006 | Agrawal et al. |
| 2007/0002726 | A1 | 1/2007 | Zangi |
| 2008/0002645 | A1* | 1/2008 | Seki et al. ................ 370/338 |
| 2008/0043613 | A1 | 2/2008 | Yang et al. |
| 2009/0196190 | A1* | 8/2009 | Li et al. ................... 370/252 |
| 2009/0232236 | A1* | 9/2009 | Yamamoto et al. ......... 375/260 |
| 2009/0279626 | A1 | 11/2009 | Wang |
| 2010/0303168 | A1 | 12/2010 | Xia |

OTHER PUBLICATIONS

Kambiz Homayounfar et al., "CQI Measurement and Reporting in LTE: A New Framework," PHYBIT, Inc., 2009.
Jim Zyren, "Overview of the 3GPP Long Term Evolution Physical Layer," White Paper, Freescale Semiconductor, Inc., 2007.
Antonis Hontzeas, "Long Term Evolution," 2009.
Ericsson, "LTE—an introduction," White Paper, 284 23-3124 Uen Rev B, Jun. 2009.
Motorola, Inc., "Long Term Evolution (LTE): A Technical Overview," Technical White Paper, 2007.
Charan Langton, "Orthogonal Frequency Division Multiplex (OFDM) Tutorial," 2004.
Stefania Sesia et al., LTE—The UMTS Long Term Evolution: from Theory to Practice, Chapter 5: "Orthogonal Frequency Division Multiple Access (OFDMA)," pp. 113-134, John Wiley & Sons, Ltd, 2009.
3rd Generation Partnership Project, "Technical Specification Group Radio Access Network; Evolved Universal Terrestrial Radio Access (E-UTRA); Physical layer procedures,(Release 8)," 3GPP TS 36.213 V8.5.0, 2008.
Jean Armstrong, "OFDM—Orthogonal Frequency Division Multiplexing," La Trobe University, 2002.
"Method and System for Selecting Cyclic Prefix Length Based on Access Point Load," U.S. Appl. No. 13/072,480, filed Mar. 25, 2011.

* cited by examiner

*Primary Examiner* — Curtis Odom

(57) ABSTRACT

During a first time interval, an access point transmits orthogonal frequency division multiplexing (OFDM) signals using a first cyclic prefix length. The access point receives a plurality of signal reports, such as Channel Quality Indicators (CQIs), from user devices being served by the access point. Based on the signal reports, the access point determines a distribution of signal qualities experienced by the user devices. The access point selects a second cyclic prefix length based, at least in part, on the distribution of signal qualities. The access point transmits OFDM signals using the second cyclic prefix length during a second time interval.

19 Claims, 3 Drawing Sheets

METHOD AND SYSTEM FOR SELECTING CYCLIC PREFIX LENGTH BASED ON SIGNAL QUALITY REPORTS

BACKGROUND

Orthogonal frequency division multiplexing (OFDM) is used in wireless communication systems, such as IEEE 802.11 (WiFi) systems, IEEE 802.16 (WiMAX) systems, and systems that use the Long Term Evolution (LTE) specifications of the Universal Mobile Telecommunications System (UMTS). In the OFDM approach, data is organized into symbols that are used to modulate a plurality of sub-carriers. The sub-carriers are spaced apart in frequency by a subcarrier spacing, $\Delta f$.

In order to reduce or eliminate inter-symbol interference (ISI) that may be caused by multipath propagation, a portion of each symbol (typically the final portion) is duplicated and appended to the beginning of the symbol as a cyclic prefix. This approach can be effective, provided that the length of the cyclic prefix, $T_{CP}$, is greater than the delay spread, $T_D$, that is caused by multipath propagation. Thus, a longer cyclic prefix can beneficially make an OFDM signal more robust against multipath propagation. However, this benefit comes at a cost. Because the cyclic prefix is redundant information, a longer cyclic prefix for a given OFDM symbol duration results in more overhead and less spectral efficiency. Although it is possible to mitigate the inefficiency caused by a longer cyclic prefix by increasing the OFDM symbol duration, $T_U$, this requires a reduction in the subcarrier spacing by the relationship $\Delta f=1/T_U$. A smaller subcarrier spacing, however, makes the OFDM signals more sensitive to frequency offsets, such as Doppler shifts, which can cause inter-carrier interference (ICI).

To balance these competing considerations, LTE specifications define three different parameterizations with three different cyclic prefix lengths for downlink communications. The basic parameterization uses a cyclic prefix length of approximately 5 microseconds. In addition, LTE specifications define a parameterization with an extended cyclic prefix length of approximately 17 microseconds. This extended cyclic prefix length is intended for larger cells (such as cells used in rural areas), which may be expected to have a larger delay spread. LTE also supports a multi-cell broadcast transmission mode with a cyclic prefix length of approximately 33 microseconds.

OVERVIEW

In a first principal aspect, an exemplary embodiment provides a method of adjusting a length of a cyclic prefix used in orthogonal frequency division multiplexing (OFDM) communications. OFDM signals using a first cyclic prefix length are transmitted through an access point. A plurality of signal quality reports are received from user devices being served by the access point. A second cyclic prefix length is selected based, at least in part, on the plurality of signal quality reports. OFDM signals using the second cyclic prefix length are then transmitted through the access point.

In a second principal aspect, an exemplary embodiment provides a method of adjusting a length of a cyclic prefix used in orthogonal frequency division multiplexing (OFDM) communications. During a first time interval, an access point transmits OFDM signals using a first cyclic prefix length. The access point receives a plurality of signal quality reports from a plurality of user devices being served by the access point. Each signal quality report indicates one of M preset signal quality values ranging from $Q_1$ to $Q_M$. For each signal quality value $Q_i$ from $Q_1$ to $Q_M$, a number of times, $R_i$, that the signal quality value, $Q_i$, was indicated in the plurality of signal quality reports is determined, to provide a distribution of signal quality values. A second cyclic prefix length is selected based, at least in part, on the distribution of signal quality values. During a second time interval, the access point transmits OFDM signals using the second cyclic prefix length.

In a third principal aspect, an exemplary embodiment provides a system comprising: (a) a transmitter for transmitting OFDM signals to user devices, wherein the OFDM signals include a cyclic prefix with a cyclic prefix length; (b) a receiver for receiving signal quality reports from the user devices; and (c) a controller coupled to the transmitter and the receiver, wherein the controller is configured to adjust the cyclic prefix periodically based, at least in part, on the signal quality reports.

DETAILED DESCRIPTION OF EXEMPLARY EMBODIMENTS

1. Introduction

Figure 1:
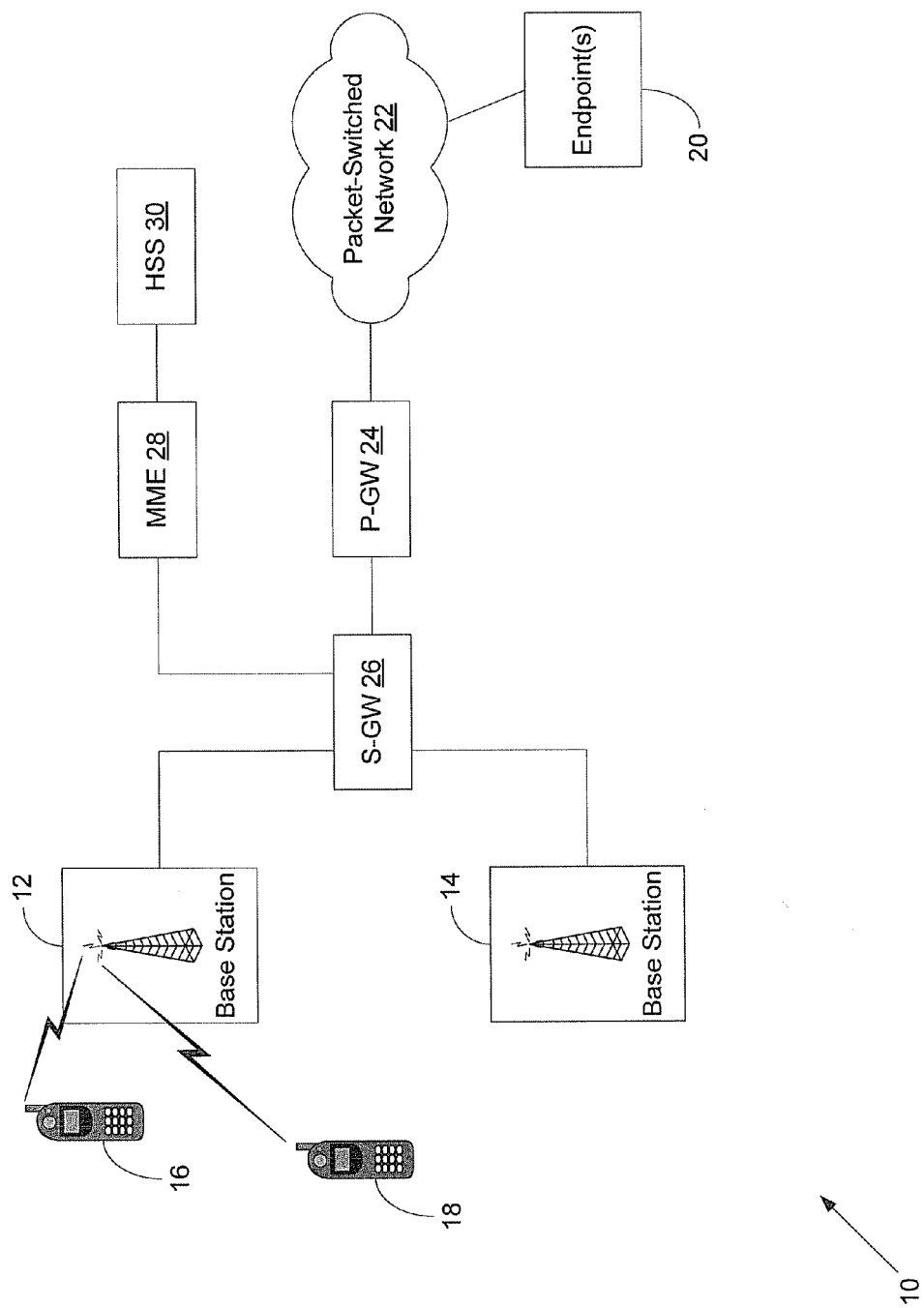
FIG. 1 is a schematic block diagram of a wireless telecommunications network, in accordance with an exemplary embodiment.

Described herein are methods and systems for adjusting a length of a cyclic prefix used in orthogonal frequency division multiplexing (OFDM) communications. In an exemplary embodiment, the cyclic prefix length used in OFDM signals is adjusted based, at least in part, on signal quality reports from devices receiving the OFDM signals. The cyclic prefix length could be adjusted periodically.

For example, during a first time interval, an access point may transmit OFDM signals to user devices using a first cyclic prefix length. The access point could be a base station of a wireless telecommunications network, and the user devices could be mobile wireless devices operating in a wireless coverage area served by the access point. The access point may receive signal quality reports from the user devices and select a second cyclic prefix based, at least in part, on the signal quality reports. The access point may then transmit OFDM signals using the second cyclic prefix during a second time interval.

The first, second, and subsequent time intervals could each be a predetermined period of time, such as a predetermined number of frames. For example, each time interval could be 20 frames and each frame could 10 milliseconds. In that case, the access point would adjust the cyclic prefix length every 200 milliseconds. It is to be understood, however, that different time intervals could be used. Moreover, it is to be understood that the adjustment of cyclic prefix length that is made from one time interval to the next could result in different cyclic prefix lengths being used during successive time intervals (e.g., the first and second cyclic prefix lengths could be the same), or could result in the same cyclic prefix lengths being used during successive time intervals (e.g., the first and second cyclic prefix lengths could be different).

The signal quality reports on which the second cyclic prefix length is based could be received during the first time interval, received during a portion of the first time interval, or received during a period of time that encompasses or overlaps the first time interval. Each signal quality report from a user device may indicate a signal quality of a signal transmitted by the access point and received by the user device.

For example, in LTE systems, a signal quality report may include a Channel Quality Indicator (CQI). In this approach, a user device receives a downlink reference signal transmitted by the access point and measures a signal-to-interference plus noise ratio (SINR). The user device then transmits a CQI to indicate a downlink data rate that can be supported based on the measured SINR. The CQI is an index, typically between 0 and 15, that identifies a specific modulation and coding scheme which, in turn, is associated with a particular data rate. Thus, the CQI index reported by a user device provides an indication of the signal quality (SINR) that the user device is experiencing. It is to be understood, however, that the use of CQIs is exemplary only. A cyclic prefix length could be selected based on signal quality reports that include other types of signal quality values or that may indicate signal qualities in other ways.

The second cyclic prefix length could be selected based, at least in part, on a distribution of signal qualities reported in the signal quality reports. For example, an access point may determine a distribution in reported signal quality values (e.g., CQI indices). The second cyclic prefix length could then be selected based on one or more characteristics of the distribution, such as its mean, median, standard deviation, percentiles, etc. In an exemplary embodiment, the second cyclic prefix length is selected so as to be adequate for at least a predetermined percentage (such as 90%) of the distribution.

To determine what cyclic prefix length is adequate, the access point may refer to a mapping between signal quality values (such as CQI indices ranging from 0 to 15) and a plurality of preset cyclic prefix lengths. The mapping may specify which of a plurality of preset cyclic prefix lengths is adequate for different signal quality values that may be reported. Thus, if the second cyclic prefix length is to be selected so as to be adequate for 90% of the distribution, the access point may determine which CQI index corresponds to the $10^{th}$ percentile of the distribution, meaning that 90% of the reports in the distribution are equal to or greater than this CQI index. The access point may then refer to the mapping to determine which cyclic prefix length the CQI index maps to. The cyclic prefix length from the mapping may be selected as the second cyclic prefix length.

The mapping could be based, for example, on the size or other characteristics of the wireless coverage area served by the access point. Thus, in a mapping for a typically-sized cell in an LTE system, a mid-range CQI index (such as 7) may map to the "normal" cyclic prefix length of 5 microseconds. Higher CQI indices, which indicate higher signal qualities, may map to shorter cyclic prefix lengths. Lower CQI indices, which indicate lower signal qualities, may map to longer cyclic prefix lengths. The mapping for a smaller cell may map the same CQI indices to shorter cyclic prefix lengths. The mapping for a larger cell may map the same CQI indices to longer cyclic prefix lengths.

In this way, the benefits of mitigating interference from multipath propagation may be balanced against the benefits of spectral efficiency by selecting a cyclic prefix length that is expected to be adequate for user devices being served by an access point (or adequate for at least a subset of the user devices), based on signal qualities reported by those user devices.

2. Exemplary Network Architecture

FIG. 1 is a simplified block diagram of a wireless telecommunications network 10 in which exemplary embodiments may be employed. For purposes of illustration, FIG. 1 shows a network architecture that may be used in an LTE system. It is to be understood, however, that other network architectures could be used.

Wireless telecommunications network 10 may include a plurality of wireless access points, which are exemplified in FIG. 1 by base stations 12 and 14. In LTE terminology, base stations 12 and 14 may each correspond to an eNodeB. Base stations 12 and 14 may each include a wireless coverage area within which the base station is able to wirelessly communicate with user devices. The wireless coverage areas of base stations 12 and 14 could be either overlapping or non-overlapping. Alternatively, the wireless coverage areas of base stations 12 and 14 could be co-extensive, or one wireless coverage area could be encompassed within another. Each wireless coverage area may correspond to a cell. A cell may, in turn, be subdivided into smaller wireless coverage areas, such as sectors. Although FIG. 1 shows wireless telecommunications network 10 with two base stations, it is to be understood that network 10 may include a greater or fewer number.

For purposes of illustration, base station 12 is shown in wireless communication with user devices 16 and 18. User devices 16 and 18 could be wireless telephones, wireless e-mail devices, wirelessly-equipped computers (such as handheld, tablet, or laptop computers), or other types of wireless communication devices. In an exemplary embodiment, the wireless communications between base station 12 and user devices 16 and 18 involve OFDM signals on the downlink (communications transmitted from the base station to a user device) and on the uplink (communications from a user device to the base station). Although FIG. 1 shows base station 12 serving two user devices, it is to be understood, that a base station may serve a greater or fewer number of user devices at a particular point in time.

User devices 16 and 18 could be engaged in communication sessions with one or more endpoints(s) 20 via base station 12. Endpoint(s) 20 may include, for example, one or more voice-over-packet (VoP) communication devices, e-mail servers, messaging servers, streaming media servers, gaming servers, and/or Web servers. In an exemplary embodiment, endpoint(s) 20 are communicatively coupled to a packet-switched network 22. Thus, a communication session between a user device and endpoint(s) 20 may involve the exchange of packets containing voice, video, text, or other data.

To support user devices' communications through packet-switched network 22, wireless telecommunications network 10 may include a packet gateway (P-GW) 24. For example, P-GW 24 may allocate Internet Protocol (IP) addresses for user devices. P-GW 24 may exchange packets with base stations 12 and 14 via a serving gateway (S-GW) 26. S-GW 26 may also serve as an anchor point for communication sessions when user devices move between base stations.

Wireless telecommunications network 10 may also include one or more control nodes that control communications involving user devices, such as user devices 16 and 18. For example, network 10 may include a mobility management entity (MME) 28, which controls communications between user devices and S-GW 26. MME 28 may, in turn, be communicatively coupled to a home subscriber server (HSS) 30, which stores subscriber information.

In an exemplary embodiment, base stations 12 and 14 transmit OFDM signals in which each symbol includes a cyclic prefix. The length of the cyclic prefix may be adjusted periodically based, at least in part, on signal quality reports transmitted by user devices, as described in more detail below. For example, each of base stations 12 and 14 may include (i) a respective transmitter that transmits OFDM signals to user devices, using a cyclic prefix having a length that may be adjusted periodically, (ii) a respective receiver that receives signal quality reports from the user devices, and (iii) a respective controller that is configured to periodically select a cyclic prefix length based on the signal quality reports received by the receiver and to control the transmitter to use the selected cyclic prefix length. Alternatively, some or all of this control function, such as selection of cyclic prefix lengths, may be performed by one or more network elements outside of the base station.

Thus, base station 12 may adjust the cyclic prefix length used in its OFDM communications based on signal quality reports from user devices operating in its wireless coverage area, such as user devices 16 and 18. For example, if user device 16 is relatively close to base station 12 and user device 18 is farther away, user device 16 may report a relatively high signal quality and user device 18 may report a lower signal quality. Base station 12 may then select a cyclic prefix length based on the distribution of signal quality reports from the user devices it is serving, including user devices 16 an 18. The selected cyclic prefix length may be adequate to eliminate inter-symbol interference (ISI) for user devices that are relatively close to base station 12, such as user device 16, but may still allow for some amount of ISI for user devices that are relatively far away from base station 12, such as user device 18.

3. Exemplary Method of Operation

Figure 2:
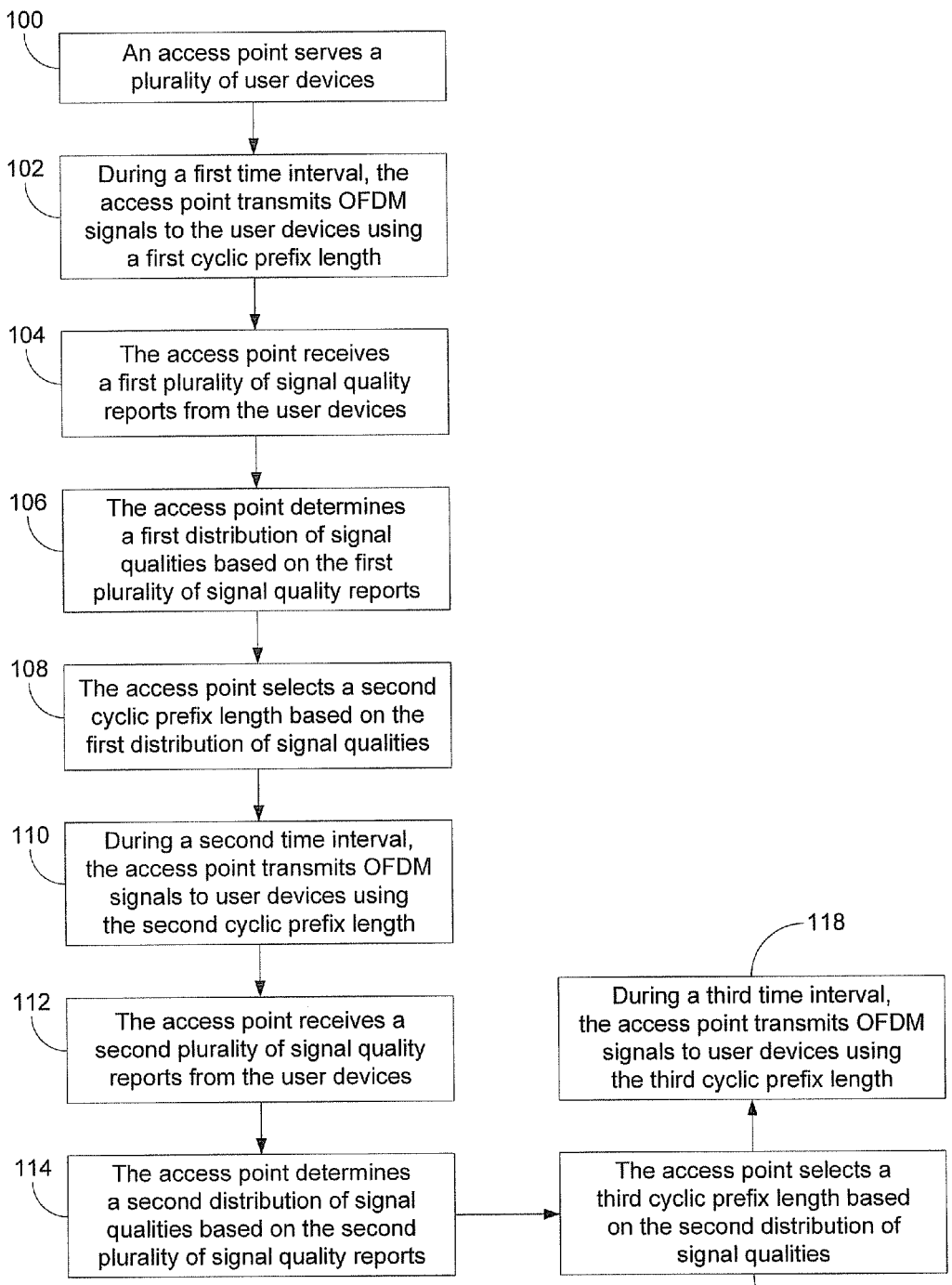
FIG. 2 is a flow chart illustrating a method of adjusting the length of a cyclic prefix used in orthogonal frequency division multiplexing (OFDM) communications, in accordance with an exemplary embodiment.

FIG. 2 is a flow chart illustrating an exemplary method of adjusting the length of a cyclic prefix used in OFDM communications. For purposes of illustration, this exemplary method is described with reference to an LTE system, such as wireless telecommunications network 10 shown in FIG. 1. It is to be understood, however, that other network architectures and other wireless communications protocols could be used. For example, the method could also be applied to IEEE 802.11 (WiFi) and IEEE 802.16 (WiMAX) systems.

The method may begin with an access point (e.g., base station 12) serving a plurality of user devices (e.g., user devices 16 and 18), as indicated by block 100. During a first time interval, the access point transmits OFDM signals to the user devices using a first cyclic prefix length, as indicated by block 102. The access point receives a first plurality of signal quality reports from the user devices, as indicated by block 104. In an exemplary embodiment, all of the signal quality reports in the first plurality are received during the first time interval. Alternatively, the first plurality of signal quality reports could be received during multiple time intervals, such as the first time interval and a preceding time interval.

The access point determines a first distribution of signal qualities based on the first plurality of signal quality reports, as indicated by block 106. In an exemplary embodiment, each signal quality report in the first plurality indicates one of M preset signal quality values, ranging from a lowest signal quality value, $Q_1$, to a highest signal quality value, $Q_M$. For example, the preset signal quality values could be CQI indices ranging from 0 to 15. The first distribution of signal qualities may be determined by counting the number of times, $R_i$, that signal quality value, $Q_i$, was reported in the first plurality of signal quality reports, for each i from 1 to M. Thus, N, the total number of reports in the distribution would be equal to the sum of all the $R_i$ values: $N=\Sigma R_i$.

Figure 3:
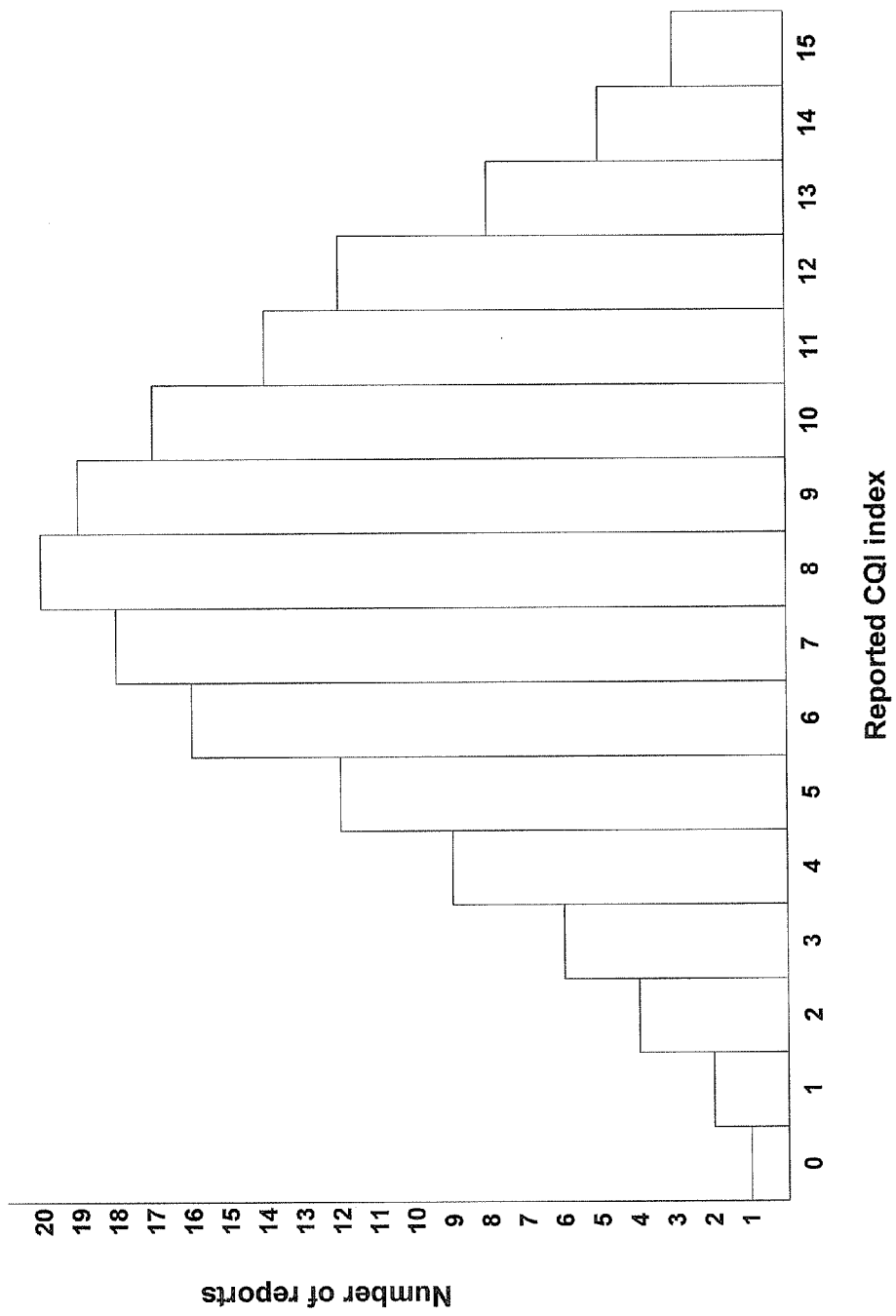
FIG. 3 is a histogram illustrating a distribution of reported signal quality values, in accordance with an exemplary embodiment.

FIG. 3 is a histogram illustrating an example distribution of signal qualities. In the example of FIG. 3, the signal qualities are reported as CQI indices ranging from 0 to 15. Thus, the distribution of FIG. 3 shows one report with CQI index=0, two reports with CQI index=1, four reports with CQI index=2, and so forth. In this example, CQI index=8 has the highest number of reports, with 20 reports, and the total number of reports in the distribution is 166. The first distribution determined in block 106 of FIG. 2 may be similar to the distribution shown in FIG. 3. It is to be understood, however, that the first distribution determined in block 106 could have a different shape and could include a greater or fewer number of reports.

It is also to be understood that the first distribution determined in block 106 might not reflect all of the signal quality values in the first plurality of signal quality reports. For example, if the first plurality of signal quality reports includes multiple signal quality reports from a given user device, then the access point might use only the most recent signal quality report from the given user device. Other criteria for screening the signal quality reports when determining the first distribution could also be used.

As indicated by block 108, the access point selects a second cyclic prefix length based on the first distribution of signal qualities. In particular, the access point could use one or more characteristics of the first distribution, such as the mean, median, standard deviation, or percentiles, to select the second cyclic prefix length. In an exemplary embodiment, the access point selects a threshold signal quality value, $Q_T$, from among the M preset signal quality values, $Q_i$, such that the number of reports with signal quality values ranging from $Q_T$ to $Q_M$ in the distribution is at least a predetermined percentage of the total number of reports in the distribution. The predetermined percentage could be, for example, 90%. However, other predetermined percentages could be used. In the case of the distribution shown in FIG. 3, the threshold signal quality value, $Q_T$, for a predetermined percentage of 90% would be CQI index=4. This is because 92% of the reports in the distribution (153 reports out of a total of 166 reports) have a CQI index of 4 or higher.

Once the access point has selected a threshold signal quality value, the access point may apply a mapping to determine what cyclic prefix length is deemed acceptable for signal qualities corresponding to the threshold signal quality value and higher signal quality values. The mapping could be specific for the access point's wireless coverage area. For example, the mapping for a typical cell in an LTE system may correspond to Table 1 as shown below:

TABLE 1

| CQI Index | Cyclic Prefix Length |
| --- | --- |
| 0 | N/A |
| 1 | 8.0 µs |
| 2 | 7.5 µs |
| 3 | 7.0 µs |
| 4 | 6.5 µs |
| 5 | 6.0 µs |
| 6 | 5.5 µs |
| 7 | 5.0 µs |
| 8 | 4.5 µs |
| 9 | 4.0 µs |

TABLE 1-continued

| CQI Index | Cyclic Prefix Length |
|---|---|
| 10 | 3.5 µs |
| 11 | 3.0 µs |
| 12 | 2.5 µs |
| 13 | 2.0 µs |
| 14 | 1.5 µs |
| 15 | 1.0 µs |

It is to be understood, however, that the mapping of Table 1 is exemplary only. Other mappings could be used, for example, based on the size or other characteristics of the access point's wireless coverage area, which may result in either higher or lower cyclic prefix lengths. In some cases, the mapping may not provide a cyclic prefix length for one or more signal quality values. For example, in LTE systems, CQI index=0 indicates that there is no downlink transmission that can be supported. As a result, Table 1 does not associate any cyclic prefix length for CQI index=0.

In the example described above with reference to FIG. 3, in which the threshold signal quality value is found to be CQI index=4, the access point may refer to the mapping shown in Table 1 and select the second cyclic prefix length to be 6.5 microseconds as the cyclic prefix corresponding to CQI index=4. It is to be understood, however, that the access point could also take one or more other factors into account, such as the access point's load or the time of day, when selecting the second cyclic prefix length. Such other factors may result in the access point selecting a second cyclic prefix length that is either higher or lower than the cyclic prefix length indicated by the mapping. For example, after determining that the threshold signal quality value maps to a cyclic prefix length of 6.5 microseconds, as described above, the access point may apply other factors to adjust the selected cyclic prefix length either upwardly or downwardly. Thus, the access point may select the second cyclic prefix based, at least in part, on the first distribution of signal qualities.

The access point may then transmit OFDM signals to user devices using the second cyclic prefix length, during a second time interval, as indicated by block 110. In an exemplary embodiment, the second time interval immediately follows the first time interval. The user devices that receive the OFDM signals during the second time interval could include some of the same user devices that received OFDM signals during the first time interval and/or different user devices, for example, due to user devices powering up or powering down or moving into or out of the access point's wireless coverage area. In any case, the user devices could become aware of the second cyclic prefix length in different ways.

For example, a user device could use a "blind detection" approach for determining the cyclic prefix length. In LTE systems, a user device looks for a known Primary Synchronization Signal (PSS), which is present at Symbol 7 of either Slot 0 or Slot 10 in each frame. Once the PSS is located, the user device looks for a known Secondary Synchronization Signal (SSS) in the preceding symbol, i.e., Symbol 6. Once the user device has determined the content of Symbols 6 and 7, the user device can determine which part of these symbols represents the cyclic prefix and, hence, can determine the cyclic prefix length.

Alternatively or additionally, the access point may broadcast an overhead message that indicates the second cyclic prefix length. The access point may broadcast the overhead message during the first time interval when the access point is still using the first cyclic prefix length. In addition to indicating the second cyclic prefix length, the overhead message may also identify the beginning of the second time interval. In this way, a user device may receive the overhead message during the first time interval and prepare to receive OFDM signals using the second cyclic prefix length during the second time interval. It is also to be understood that the second cyclic prefix length could be the same as the first cyclic prefix length. In that case, the access point may forego sending an overhead message.

As indicated by block 112, the access point receives a second plurality of signal quality reports from the user devices. The second plurality of signal quality reports may be received entirely during the second time interval or may include signal quality reports that the access point received during one or more previous time intervals (such as the first time interval). The access point determines a second distribution of signal quality values based on the second plurality of signal quality reports, as indicated by block 114. The access point may determine the second distribution in the same or similar manner as used to determine the first distribution.

The access point selects a third cyclic prefix length based on the second distribution of signal qualities, as indicated by block 116. The access point may select the third cyclic prefix in the same or similar manner as used to select the second cyclic prefix. The access point then transmits OFDM signals using the third cyclic prefix length to user devices, using the third cyclic prefix length, during the third time interval, as indicated by block 118. The third cyclic prefix length could be the same as the second prefix length, or it could be different. For example, if the second distribution is more heavily weighted toward low signal qualities then the first distribution, then the third cyclic prefix length could be longer than the second cyclic prefix length. On the other hand, if the second distribution is more heavily weighted toward high signal qualities than the first distribution, the third cyclic prefix length could be shorter than the second cyclic prefix length.

In this way, an access point may adjust the cyclic prefix length based on the needs of the user devices that the access point is serving, as indicated by the signal qualities that the user devices report. More particularly, by selecting a cyclic prefix length that is adequate for at least a predetermined percentage of user devices (such as 90%), the access point can beneficially use air interface resources more efficiently than if a fixed cyclic prefix length designed to be acceptable for all user devices is used. Although some user devices may receive OFDM signals with a non-optimal cyclic prefix length, a user device may cope with a certain amount of ISI, for example, by requesting a different modulation scheme or coding rate, by requesting retransmission of data that it receives with errors, or by handing off to a different access point.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:
1. A method of adjusting a length of a cyclic prefix used in orthogonal frequency division multiplexing (OFDM) communications, comprising:
transmitting, through an access point, OFDM signals using a first cyclic prefix length;

receiving a first plurality of signal quality reports from user devices being served by said access point, wherein each of said signal quality reports indicates a reported signal quality value;

determining a distribution of reported signal quality values based on said first plurality of signal quality reports;

selecting a second cyclic prefix length based, at least in part, on said first plurality of signal quality reports, wherein selecting said second cyclic prefix length based, at least in part, on said signal quality reports comprises selecting said second cyclic prefix length based, at least in part, on said distribution of reported signal quality values; and transmitting, through said access point, OFDM signals using said second cyclic prefix length.

2. The method of claim 1, wherein said distribution of reported signal quality values includes a plurality of signal quality values, $Q_i$, ranging from a lowest signal quality value, $Q_l$, to a highest signal quality value, $Q_M$.

3. The method of claim 2, wherein said distribution of reported signal quality values includes for each signal quality value, $Q_i$, a corresponding number of reports, $R_i$, of that signal quality value.

4. The method of claim 3, wherein said distribution of reported signal quality values includes a total number of reports, N, wherein $N=\Sigma R_i$.

5. The method of claim 4, wherein selecting said second cyclic prefix length based, at least in part, on said distribution of reported signal quality values comprises:

determining a mean signal quality value in said distribution of reported signal quality values; and selecting said second cyclic prefix length based, at least in part, on said mean signal quality value.

6. The method of claim 4, wherein selecting said second cyclic prefix length based, at least in part, on said distribution of reported signal quality values comprises:

determining a threshold signal quality value, $Q_T$, such that the number of reports with signal quality values ranging from $Q_T$ to $Q_M$ in the distribution is at least a predetermined percentage of said total number of reports; and selecting said second cyclic prefix length based, at least in part, on said threshold signal quality value, $Q_T$.

7. The method of claim 1, wherein said signal quality reports comprise Channel Quality Indicators (CQIs).

8. The method of claim 1, wherein said first cyclic prefix length is used during a first time interval and said second cyclic prefix length is used during a second time interval, and wherein at least a portion of said first plurality of signal quality reports is received during said first time interval.

9. The method of claim 8, further comprising:

receiving a second plurality of signal quality reports, wherein at least a portion of said second plurality of signal quality reports is received during said second time interval; and selecting a third cyclic prefix length based, at least in part, on said second plurality of signal quality reports; and transmitting, through said access point, OFDM signals using said third cyclic prefix length, wherein said third cyclic prefix is used during a third time interval.

10. The method of claim 1, wherein said second cyclic prefix length differs from said first cyclic prefix length.

11. A method of adjusting a length of a cyclic prefix used in orthogonal frequency division multiplexing (OFDM) communications, comprising:

during a first time interval, an access point transmitting OFDM signals using a first cyclic prefix length;

said access point receiving a plurality of signal quality reports from a plurality of user devices being served by said access point, wherein each signal quality report indicates one of M preset signal quality values ranging from $Q_l$ to $Q_M$;

for each signal quality value $Q_i$ from $Q_l$ to $Q_M$, determining a number of times, $R_i$, that said signal quality value, $Q_i$, was indicated in said plurality of signal quality reports, to provide a distribution of signal quality values;

selecting a second cyclic prefix length based, at least in part, on said distribution of signal quality values; and during a second time interval, said access point transmitting OFDM signals using said second cyclic prefix length.

12. The method of claim 11, wherein said plurality of signal quality reports is received during said first time interval.

13. The method of claim 11, wherein selecting said second cyclic prefix length based, at least in part, on said distribution of signal quality values comprises:

referring to a mapping between at least a subset of said M preset signal quality values and a plurality of preset cyclic prefix lengths; and selecting said second cyclic prefix length from among said preset cyclic prefix lengths, such that said second cyclic prefix length is adequate, according to said mapping, for at least a predetermined percentage of signal quality values in said distribution of signal quality values.

14. The method of claim 11, wherein said signal quality reports comprise Channel Quality Indicators (CQIs), wherein M=16, and wherein said M preset signal quality values range from 0 to 15.

15. The method of claim 11, wherein said second cyclic prefix length differs from said first cyclic prefix length.

16. A system, comprising:

a transmitter for transmitting OFDM signals to user devices, wherein said OFDM signals include a cyclic prefix with a cyclic prefix length;

a receiver for receiving signal quality reports from said user devices; and a controller coupled to said transmitter and said receiver, wherein said controller is configured to adjust said cyclic prefix length periodically based, at least in part, on said signal quality reports by a process comprising: (i) controlling said transmitter to use a first cyclic prefix length during a first time interval; (ii) determining a distribution of signal qualities experienced by said user devices based on signal quality reports received by said receiver; (iii) selecting a second cyclic prefix length based, at least in part, on said distribution; and (iv) controlling said transmitter to use said second cyclic prefix length during a second time interval.

17. The system of claim 16, wherein said second cyclic prefix length differs from said first cyclic prefix length.

18. The system of claim 16, wherein said transmitter, receiver, and controller are in a base station of a wireless telecommunications network.

19. The system of claim 16, wherein said signal quality reports comprise Channel Quality Indicators (CQIs).

* * * * *